Figure 3:
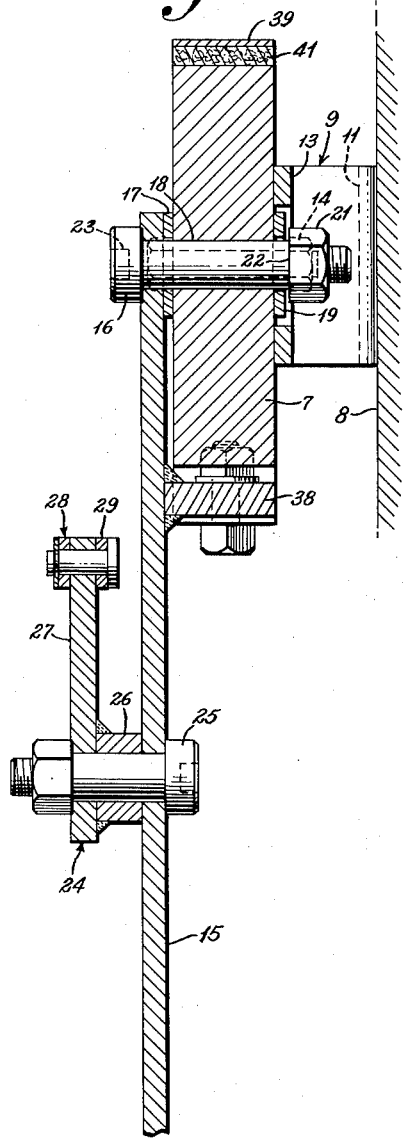

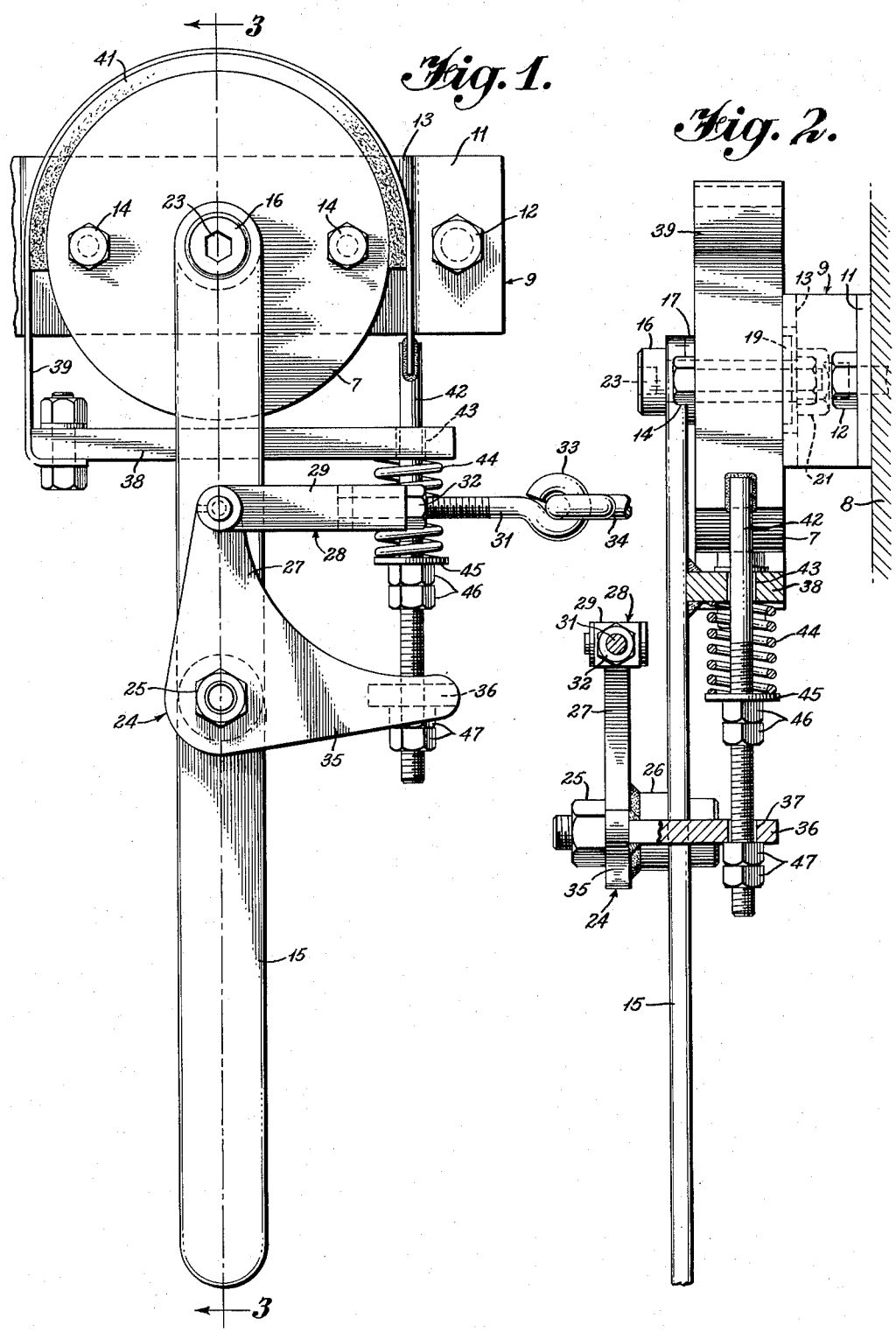

Aug. 27, 1957

T. M. LEIGH 2,803,972

CONTROL LEVER MECHANISMS

Filed June 17, 1953

3 Sheets-Sheet 2

Aug. 27, 1957

T. M. LEIGH 2,803,972

CONTROL LEVER MECHANISMS

Filed June 17, 1953

3 Sheets-Sheet 3

United States Patent Office

2,803,972
Patented Aug. 27, 1957

2,803,972

CONTROL LEVER MECHANISMS

Theodore M. Leigh, Cedar Rapids, Iowa, assignor, by mesne assignments, to Link-Belt Speeder Corporation, Cedar Rapids, Iowa, a corporation of Illinois Application June 17, 1953, Serial No. 362,267

20 Claims. (Cl. 74—531)

This invention relates to new and useful improvements in control lever mechanisms, and deals more particularly with such mechanisms that are used to move controllable elements or devices to and maintain them in different desired positions or conditions of adjustment.

Control mechanisms of the above mentioned type have been widely used in the past for the positional or conditional control of a variety of movable elements or adjustable devices, such as hopper gates, dampers, window sash, doors, governors and throttles for internal combustion and diesel engines, and for other similar applications. In such installations, the control lever mechanisms may be located adjacent to the controllable elements or devices or at a remote point relative thereto, and the force opposing the action of control mechanisms in some instances may be fixed and in others variable for the different positions or conditions of adjustment of the controllable elements or devices. In pratically all installations of this type, however, the control lever mechanisms should be readily movable to effect a change or adjustment in the position or condition of the controllable elements or devices.

Generally speaking, control lever mechanisms such as those mentioned above may be classified into two general types; such as, step-by-step and friction, according to the means employed for maintaining the control lever mechanisms and the controllable elements or devices in their selected positions or conditions.

The step-by-step type, which is characterized by a pawl and ratchet, or similar holding means, offers the advantage of providing a positive holding force to prevent movement of the controllable element or device. This type, however, does not afford infinitely variable positions or conditions of adjustment because the number of ratchet teeth employed and their spacing are the controlling factors.

The friction type, which is characterized by the use of two relatively movable friction elements to provide the desired holding force, does afford infinitely variable positions of adjustment of the controllable elements or devices and, for that reason, is generally the preferred type for many installations.

In a substantial percentage of the situations normally encountered where control lever mechanisms are required, the opposing force exerted by the controllable element or device, and which must be overcome in effecting movement of the lever of the control mechanism, will vary between maximum and minimum limits depending on the position occupied by the controllable element or the condition under which the controllable device is operating.

When a friction type, control lever mechanism of the prior art is employed in such situations, the two cooperating friction elements must be set or adjusted to provide a constant or uniform holding force that is sufficient to overcome the maximum opposing force that is exerted by the controllable element or device. Consequently, it has been unnecessarily difficult to move the levers of prior art, friction type control mechanisms during periods when the opposing forces exerted by the controllable elements or devices are relatively low.

It is the primary object of this invention to provide a control lever mechanism for actuating and holding a controllable element or device in any selected position or condition of adjustment with the force required to move the lever of the mechanism being variable in accordance with variations in the opposing force applied to the lever by the controllable element or device.

Another important object of this invention is to provide a control lever mechanism which is actuated to adjust the position or condition of a controllable element or device, movement of said mechanism being resisted and said mechanism being maintained in its actuated condition by a holding force that is variable in accordance with the opposing forces exerted by the controllable element or device.

Still another important object of the invention is to provide a control lever mechanism of the friction type for actuating a controllable element or device that applies a unidirectional force, which may be constant or variable, to the actuating lever of the control mechanism, the friction device that provides the holding force for such control lever mechanism being operable to automatically regulate the value of the friction holding force, while the actuating lever is stationary, so that said holding force at all times bears a proportional relationship to the value of the unidirectional force that is applied to said actuating lever by the controllable element or device, and to automatically regulate the value of the friction holding force, when the actuating lever is moved, so that said holding force is increased when the actuating lever is moved in the direction of application of force to said lever by the controllable element or device and is decreased when the actuating lever is moved in the direction which opposes such applied force.

A further object of the invention is to provide a control lever mechanism which will operate to effect an infinite number of positions or conditions of adjustment of the controllable element or device.

Other objects and advantages of the invention will be apparent during the course of the following description.

Figure 6:
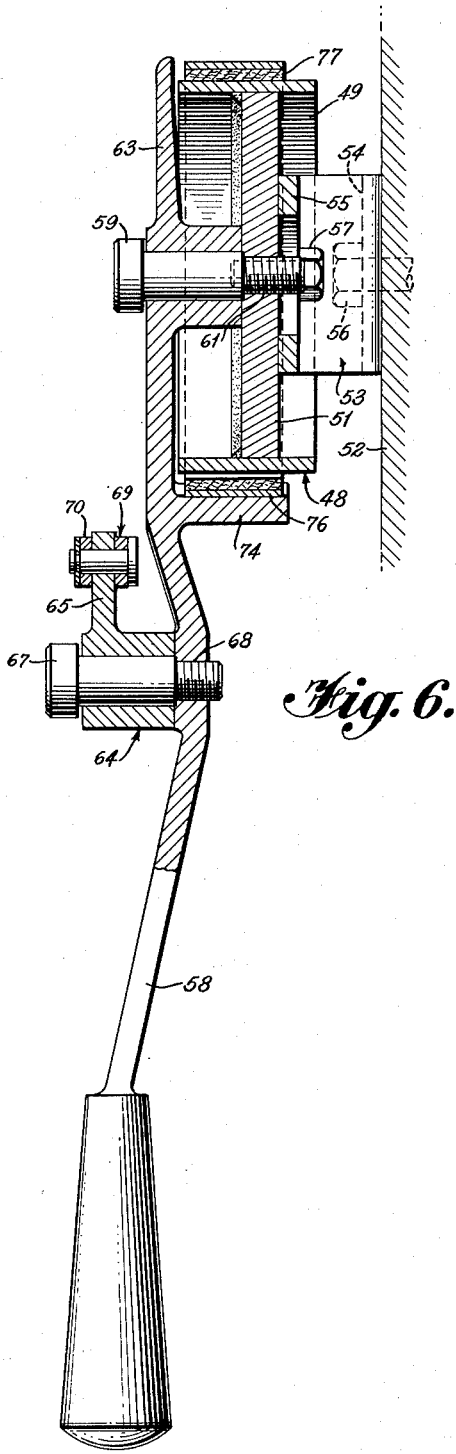
Figure 4:
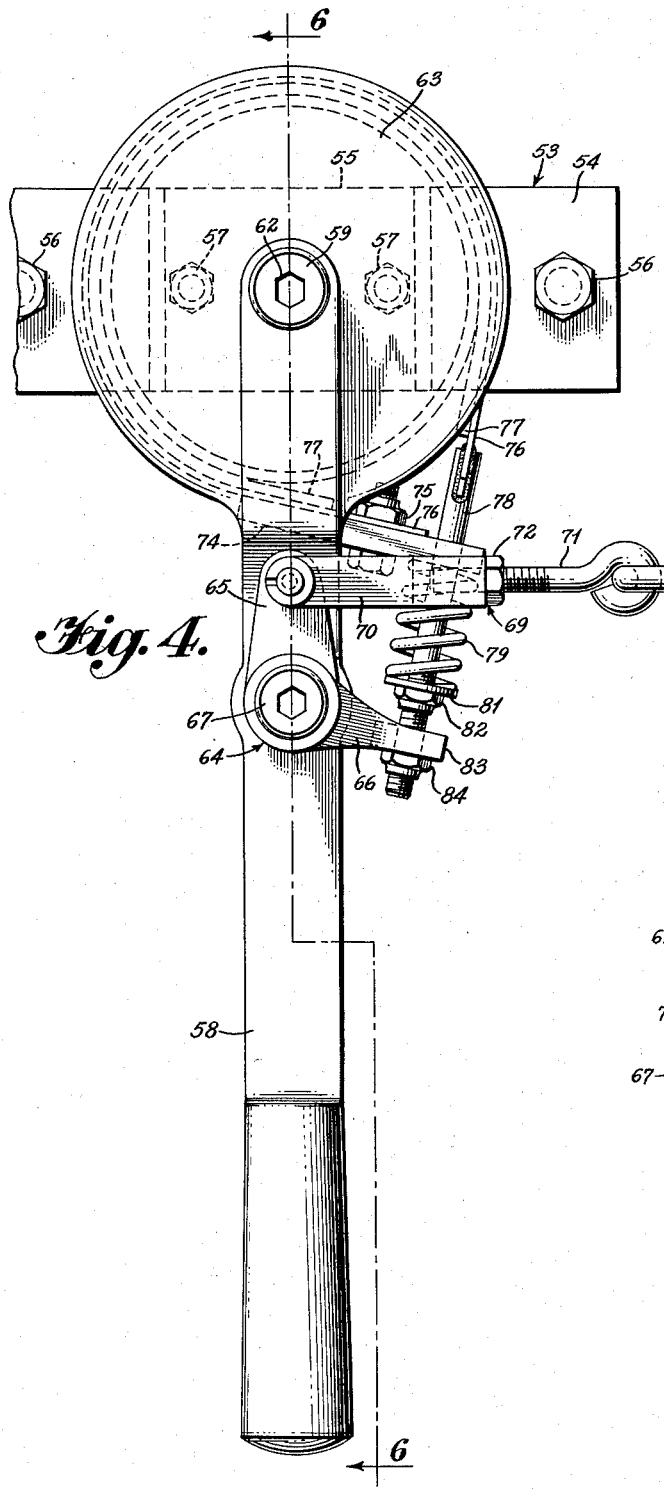
Figure 5:
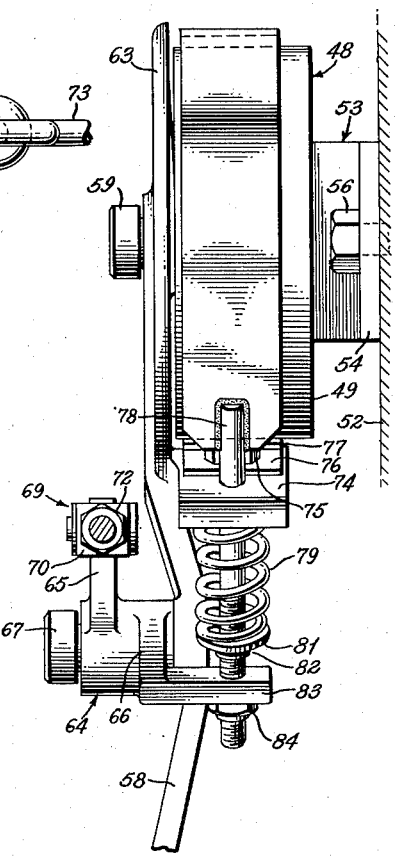

In the accompanying drawings forming a part of this specification and in which like reference characters are employed to designate like parts throughout the same, Figure 1 is a front elevational view of one embodiment of the invention, Figure 2 is a side elevational view, partly in cross section, of the device illustrated in Fig. 1, Figure 3 is a vertical sectional view taken on line 3—3 of Fig. 1, Figure 4 is a front elevational view of a modified form of the invention, Figure 5 is a fragmentary side elevational view of the device illustrated in Fig. 4, and Figure 6 is a vertical sectional view taken on line 6—6 of Fig. 4.

In the drawings, wherein for the purpose of illustration are shown the preferred embodiments of this invention, and first particularly referring to Figs. 1 to 3, inclusive, reference character 7 designates a cylinder or drum that is mounted in a stationary position on a support 8, or the like, by a bracket 9. The bracket 9 is provided with mounting feet 11 at its opposite end portions which are fastened to the support 8 by set screws 12, or the like. The central portion 13 of the bracket 9 is outwardly offset from the mounting feet 11 for connection to the drum 7 by bolts 14.

An operating lever or handle 15 is pivotally attached to the drum 7 at its axis by means of a pin 16 which extends through the end of the handle 15, the washer 17, the central opening 18 in the drum 7, and the washer 19 located at the back of the drum. At its inner end portion, the pin 16 is reduced in diameter and threaded to receive a nut 21 which is tightened into locking engagement with the shoulder 22 of the pin. A multi-sided recess or socket 23 is formed in the head of the pin 16 for receiving a suitable tool to assist in tightening the nut 21 against the shoulder 22.

A bell crank 24, or any other suitable type of leverage device, is pivotally mounted on the handle 15 by a bolt or pin 25 and is held in outwardly spaced relationship from the handle by a collar 26 which is welded, or otherwise suitably connected, to the bell crank. One arm 27 of the bell crank 24 is pivotally connected to a link 28 formed of a clevis 29 having an eye bolt 31 threaded into its outer end portion so that the length of the link may be adjusted. A lock nut 32 is provided for maintaining the proper adjustment of the length of the link 28. The eye 33 of the bolt 31 is adapted to receive a member 34 by means of which the link 28 is connected to the element or device to be controlled or adjusted, which is not illustrated.

It is to be understood that the element or device to which the member 34 is connected does not form a part of this invention, and that the invention is adapted for controlling the position or condition of a variety of movable elements or adjustable devices that apply variable or constant forces to the mechanism of the invention.

The second arm 35 of the bell crank 24 has mounted thereon a lug 36 which projects inwardly into vertical alinement with the drum 7 and has formed in its inner end portion an opening 37.

Rigidly mounted on the handle 15 adjacent the drum 7 is a bar 38 that is arranged in spaced tangential relationship with the periphery of the drum. The left-hand end portion of the bar 38 has connected thereto one end of a metal band 39 which is trained around the periphery of the drum 7 and is provided with a friction lining 41 that is bonded to its inner surface and is in frictional engagement with the peripheral surface of the drum. The lining 41 may be formed of any suitable material but is preferably formed of an impregnated wire mesh or fabric such as is used for the brake linings of automobiles, or the like. At the end portion of the band 39 opposite its point of connection to the bar 38, a rod 42 is welded, or otherwise suitably connected, to the band and extends through a hole 43 in the bar 38 and through a helical spring 44. The lower end portion of the rod 42 is threaded and receives a washer 45 that is supported on the rod by a pair of lock nuts 46 in such a position as to compress the spring 44 between the washer and the bar 38. In downwardly spaced relationship from the lock nuts 46, the threaded end portion of the rod 42 extends through the opening 37 of the lug 36 and additional lock nuts 47 are threaded on the lower end portion of the rod to provide a stop against which the lug 36 may bear.

The operation of the above modification of the invention will be described as follows:

The element or device, the position or condition of which is to be controlled, is connected to the control lever or handle 15 through the member 34, the link 28 and the bell crank 24. It will be readily apparent, therefore, that movement of the handle 15 about its pivot pin 16 will effect adjustment of the element or device providing pivotal movement of the bell crank 24 relative to the handle 15 is restricted. It will also be apparent that pivotal movement of the bell crank 24 on the handle 15 is limited in one direction by engagement between the lug 36 on the bell crank and the lock nuts 47 on the rod 42.

The turning moment or force applied in one direction to the bell crank 24 through the member 34 and the link 28, therefore, will cause a corresponding force to be applied to the lower end portion of the rod 42 and will cause the lining 41 on the band 39 to be urged into frictional engagement with the peripheral surface of the drum 7. Since the bell crank acts as a lever in transmitting force from the controllable element or device to the rod 32, the pressure of the frictional engagement will be varied in direct proportion with variations in the force applied to the bell crank by the element or device.

In other words, variations in the force applied to the bell crank 24 by the controllable element or device which would tend to cause pivotal movement of the handle 15 will effect proportional variations in the pressure of the frictional engagement between the lining 41 and the peripheral surface of the drum 7 so as to prevent movement of the handle by the element or device. On the other hand, the operating lever or handle 15 may be manually moved to vary the adjustment of the controllable element or device while the bell crank 24 is held against pivotal movement by the rod 42. After movement of the handle it is maintained in its adjusted position by the pressure of the frictional engagement between the lining 41 and the peripheral surface of the drum 7.

If the force exerted by the controllable element or device is intermittent, or if for any other reason the force applied to the bell crank 24 by the link 28 is released, the handle 15 will be maintained at its existing position by the force of the spring 44 acting on the rod 42 to maintain the pressure of the frictional engagement between the lining 41 and the drum 7 at a minimum value.

Referring now to Figs. 4 to 6, inclusive, for a detail description of the modification illustrated therein, the cylinder or drum 48 is formed by an annular member 49 which is welded to the periphery of the disk 51. The drum 48 is mounted in a stationary position on a support 52, or the like, by a bracket 53 having mounting feet 54 and an outwardly offset central portion 55. The mounting feet 54 are fastened to the support 52 by set screws 56 and the central portion 55 is connected to the drum 48 by set screws 57.

An operating lever or handle 58 is pivotally mounted at the axis of the drum 48 by a pin 59 which extends through the handle and is threaded into the tapped opening 61 in the center of the disk 51. The pin 59 is shouldered at the base of its threaded end portion to provide a stop which is seated against the disk 51 to maintain the pin in a fixed position on the disk. The head of the pin 59 is provided with a multi-sided recess or socket 62 for receiving a tool by means of which the pin may be threaded into the tapped opening 61. At its pivotally mounted end portion, the handle 58 is provided with a disk-shaped cover or guard 63 which overlies the outer face of the drum 48.

Pivotally mounted on the handle 58, in spaced relationship with its pivotal mounting on the pin 59, is a bell crank 64 having a pair of angularly displaced arms 65 and 66. The pivotal mounting of the bell crank 64 is provided by a pin 67 which extends through an opening in the crank and is threaded into a tapped opening 68 in the handle 58. The pin 67 is shouldered at the base of its threaded portion for engagement with the handle 58 to lock the pin in position on the handle and to maintain sufficient spacing between the handle and the head of the pin to permit free pivotal movement of the crank.

Pivotally mounted on the outer end of the arm 65 is a link 69 formed of a clevis 70 having an eye bolt 71 threadedly connected thereto for longitudinal adjustment to vary the length of the link. The eye bolt 71 is locked in a fixed position on the clevis 70 by a lock nut 72. A member 73 is connected to the eye of the bolt 71 for connecting the clevis 70 to an element or device, not shown, the position or condition of which is to be controlled.

A lug 74 projects inwardly from the handle 58 adjacent the drum 48 and has connected thereto, by means of a bolt 75, the strap or band 76. This strap 76 projects from the lug 74 in a direction opposite that of the link 69 and is wrapped around the drum 48. Bonded to the inner surface of the strap 65, for frictional engagement with the periphery of the drum 48, is a lining or friction member 77 that may be formed of any suitable material but is preferably formed of an impregnated wire mesh or fabric of the type commonly used for the linings of automobile brakes.

The end portion of the strap 76, opposite its point of connection with the lug 74, has welded thereto a rod 78 which passes freely through an opening in the lug 74 and has positioned thereon a spring 79, one end of which bears against the lug 74. The other end of the spring 79 is urged in a direction to compress the spring by a washer 81 which is supported on the rod 78 by a nut 82. The threaded end portion of the rod 78 which extends beyond the nut 82 passes through an opening in a lug 83 that extends inwardly from the end of the arm 66 of the crank 64. Movement of the lug 83 relative to the rod 78 is limited in one direction by the nut 84 that is threaded onto the end of the rod.

The operation of the device illustrated in Figs. 4 to 6, inclusive, is identical to that of the device illustrated in Figs. 1 to 3, inclusive, and will not be repeated.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In a control lever mechanism, movable linkage, exerting a unidirectional force, the position of which linkage is to be controlled, a first member movable for effecting movement of the linkage, a second member mounted on the first member for movement therewith and relative thereto, means for connecting the second member to the linkage, a stationary friction cylinder, and a movable friction band separately connected to said first and second members for applying forces thereto to restrict relative movement therebetween so that movement of the first member will move the linkage, said movable friction band being urged, by the forces restricting said relative movement between the first and second members, into frictional engagement with said stationary friction cylinder to hold the first member and the linkage in fixed positions after they have been moved.

2. In a control lever mechanism, movable linkage, exerting a unidirectional force, the position of which linkage is to be controlled, a first member movable for effecting movement of the linkage, a second member pivotally mounted on said first member, means for connecting said linkage to a point on said second member that is spaced from the pivotal mounting of the latter member to cause the opposed forces exerted by said first member and the linkage to apply a turning moment to said second member, a stationary friction cylinder, and a movable friction band separately connected to said first and second members for resisting said turning moment of the second member to permit movement of said first member to move the linkage, said movable friction band being actuated by said turning moment for movement to frictionally engage said stationary friction cylinder with the pressure of the frictional engagement varying in direct relationship with variations in the opposed forces exerted by the first member and linkage to prevent movement of the first member by the linkage.

3. In a control lever mechanism, movable linkage, exerting a unidirectional force, the position of which linkage is to be controlled, a member movable for effecting movement of the linkage, a lever pivotally mounted on said member and having an arm connected to the linkage and arranged in angular relationship with the path of movement of the pivot point of the lever, the opposed forces applied to said lever by the member and linkage urging the lever to partake of pivotal movement relative to said member, a stationary friction member, and a movable friction member constantly engaging said stationary member, and connected to and movable relative to said lever for restricting pivotal movement of the lever to permit movement of the linkage by the member, said movable friction member being actuated, by the restricting of the said pivotal movement of the lever, to frictionally engage the stationary friction member with a pressure that is variable in direct relationship with said opposed forces for preventing movement of said first mentioned member by the linkage.

4. In a control lever mechanism, movable linkage the position of which is to be controlled, a first lever, a second lever pivotally mounted on said first lever and connected to said linkage for moving the latter when the first lever is moved and the second lever is held against pivotal movement, a stationary friction cylinder, and a movable friction band connected at its opposite ends to said first and second levers and arranged in frictional engagement with the stationary friction cylinder for both preventing pivotal movement of said second lever and holding said first lever and the linkage in fixed positions after they have been moved.

5. In a control lever mechanism, movable linkage, exerting a unidirectional force, the position of which linkage is to be controlled, a first lever, a second lever pivotally mounted on said first lever and connected to said linkage for moving the latter when the first lever is moved and the second lever is held against pivotal movement, a stationary friction cylinder, a movable friction band connected at its opposite ends to said first and second levers and arranged for frictional engagement with said stationary friction cylinder, and means for maintaining a minimum frictional engagement between said stationary friction cylinder and movable friction band at all times, said movable friction band holding said second lever against pivotal movement relative to said first lever to permit movement of the linkage by the first lever, and variations in the forces applied to said second lever by said first lever and linkage effecting variations in the frictional engagement between said stationary friction cylinder and movable friction band to prevent movement of the first lever by the linkage.

6. In a control lever mechanism, movable linkage, exerting a unidirectional force, the position of which linkage is to be controlled, a first lever, a second lever pivotally mounted on said first lever and connected to said linkage for moving the latter when the first lever is moved and the second lever is held against pivotal movement, a stationary member having a cylindrical surface arranged in axially spaced concentric relationship with the pivot point of the first lever, and a band connected to said first lever and trained around said cylindrical surface for connection with said second lever, said band being movable around said cylindrical surface by movement of said first lever and restricting pivotal movement of said second lever to permit movement of the first lever to move the linkage, said linkage applying a force to said second lever for urging pivotal movement of the latter to vary the pressure of the frictional engagement between said band and the cylindrical surface in a direct relationship with variations in the force applied by the linkage, and said frictional engagement preventing movement of the first lever by the linkage.

7. In a control lever mechanism, linkage urged in a given direction and the position of which linkage is to be controlled, a first lever, a second lever pivotally mounted on said first lever and connected to said linkage for moving the latter in and opposite to said given direction when the first lever is moved in opposite directions and the second lever is held against pivotal movement, a stationary member having a cylindrical surface arranged in axially spaced concentric relationship with the pivot point of the first lever, and a band connected to said first lever and trained around said cylindrical surface for connection with said second lever, said band restricting pivotal movement of said second lever to permit movement of said linkage by said first lever, the band being movable around said cylindrical surface in a direction toward its connection with said second lever to de-energize the frictional engagement between the band and surface when the first lever is moved to move the linkage in a direction opposite said given direction and being movable in the opposite direction around said surface to energize the frictional engagement between the band and surface when the first lever is moved to move the linkage in said given direction, said linkage at all times applying a force to said second lever for urging pivotal movement of the latter to vary the pressure of the frictional engagement between the band and surface in a direct relationship with the force urging said linkage in said given direction, and said frictional engagement preventing movement of said first lever by said linkage.

8. In a control lever mechanism, linkage urged in a given direction by a variable force and the position of which linkage is to be controlled, a first lever, a second lever pivotally mounted on said first lever and connected to said linkage for moving the latter in and opposite to said given direction when the first lever is moved in opposite directions and the second lever is held against pivotal movement, a stationary member having a cylindrical surface arranged in axially spaced concentric relationship with the pivot point of the first lever, a band connected to said first lever and trained around said cylindrical surface for connection with said second lever, and resilient means urging said band into frictional engagement with said surface, said band restricting pivotal movement of said second lever to permit movement of said linkage by said first lever, the band being movable around said cylindrical surface in a circumferential direction toward the connection of said band with said second lever to de-energize the frictional engagement between the band and surface when the first lever is moved to move the linkage in a direction opposite said given direction and being movable in the opposite direction around said surface to energize the frictional engagement between the band and surface when the first lever is moved to move the linkage in said given direction, said resilient means applying a minimum force and said linkage applying a variable force to said second lever for urging pivotal movement of the latter to vary the pressure of said frictional engagement between a minimum value corresponding to said minimum force and higher values bearing a direct relationship with the force urging said linkage in said given direction, and said frictional engagement preventing movement of said first lever by said linkage.

9. In a control lever mechanism, movable linkage the position of which is to be controlled, a pivoted first lever operable to effect movement of the linkage, a holding device comprising two relatively movable members engageable with each other to effect their holding action, means fixedly connecting the pivoted first lever to one of the members of the holding device, means constantly applying an engagement producing force to the members of the holding device, a second lever, separate from and movable relative to said holding device, pivotally mounted on the first lever, means connecting the linkage to one part of the second lever for urging the latter to partake of pivotal movement in response to forces applied to said linkage, and means connecting one of the members of the holding device to a different part of the second lever, said second lever acting to transmit to said one member of the holding device, as an additional engagement producing force, any force in tension exerted on said second lever by the linkage.

10. A control lever mechanism as defined in claim 9 further characterized by the relatively movable members of the holding device comprising a stationary cylinder and a movable band partially wrapped around the periphery of said cylinder.

11. A control lever mechanism as defined in claim 10 further characterized by means for fastening one end of the movable band to the first lever, and means for adjustably connecting the other end of the band to the second lever.

12. A control lever mechanism as defined in claim 11 further characterized by the means constantly applying an engagement producing force to the members of the holding device being resilient and being connected to the end of the band that is adjustably connected to the second lever.

13. A control lever mechanism as defined in claim 12 further characterized by the second lever being a bell crank having one arm connected to the end of the band that is connected to said resilient means and to the linkage.

14. A control lever mechanism as defined in claim 9 further characterized by the relatively movable members of the holding device comprising a stationary member and a movable member, and yieldable means for constantly applying an engagement producing force to the movable member.

15. A control lever mechanism as defined in claim 14 further characterized by means for adjusting the yieldable means to vary the value of the engagement producing force that is constantly applied to the movable member.

16. A control lever mechanism as defined in claim 15 further characterized by the second lever being a bell crank, and means for adjustably connecting one arm of the bell crank lever to the movable member of the holding device.

17. In a control lever mechanism, movable linkage the position of which is to be controlled, a pivoted first lever operable to effect movement of the linkage, a laterally projecting, apertured member rigidly fastened to the first lever in spaced relationship to its pivot point, a holding device comprising a stationary cylindrical member concentric with the pivot point of the first lever, and a movable band member partially wrapped around the cylindrical member, means for anchoring one end of the band member to the said laterally projecting, apertured member, a rod fastened to the other end of the band member and movably projecting through the aperture of the laterally projecting member, a second lever pivotally mounted on the first lever, means connecting the linkage to one part of the second lever, and means connecting the projecting portion of said rod to a different part of the second lever.

18. A control lever mechanism as defined in claim 17 further characterized by the provision of means for constantly applying a force to the said rod tending to tighten the movable band around the cylindrical member.

19. A control lever mechanism as defined in claim 18 further characterized by the means for constantly applying a force to said rod comprising a spring bearing at one end against the said laterally projecting, aperture member, and means adjustably connected to said rod against which the other end of the spring bears.

20. A control lever mechanism as defined in claim 17 further characterized by the second lever being a bell crank, means adjustably connecting the linkage to one arm of the bell crank lever, and means adjustably connecting the projecting portion of said rod to the second arm of the bell crank lever.

References Cited in the file of this patent

UNITED STATES PATENTS

| | | |
|---|---|---|
| 245,959 | Johnson et al. | Aug. 23, 1881 |
| 823,971 | Remondy | June 19, 1906 |
| 887,180 | Barnes | May 12, 1908 |
| 2,088,880 | Strange | Aug. 3, 1937 |